Patented Feb. 20, 1945

2,369,969

UNITED STATES PATENT OFFICE 2,369,969

ACID WOOL DYESTUFFS OF THE ANTHRAQUINONE SERIES

Ralph N. Lulek and Oliver H. Johnson, Wilmington, Del., assignors to E. I. du Pont de Nemours & Company, Wilmington, Del., a corporation of Delaware No Drawing. Application May 22, 1940, Serial No. 336,594

1 Claim. (Cl. 260—374)

This invention relates to the preparation of new and valuable dyes of the acid wool series which dye in gray to olive shades and which exhibit excellent light fastness.

A large amount of research has been carried out in an endeavor to prepare wool dyestuffs which will dye in gray to olive shades and which will have the necessary light fastness to be useful on fabrics which are exposed day after day to the effect of sunlight. At the present time, a number of the olive and taupe shades are prepared from dyestuffs made up by mixing several colors, and in such cases each of the dyes used must exhibit good fastness properties or the ultimate mixed color is deficient.

It is an object of this invention to prepare new acid wool dyestuffs of the anthraquinone series which dye in gray to olive shades and which exhibit excellent light fastness.

We have found that dyestuffs which dye wool in gray to olive shades and which have excellent light fastness, particularly after chroming can be produced by condensing mono- or di-bromo-fluorenone or its derivatives with aminoanthraquinone compounds and then sulfonating the resulting condensation product. Nitro, amino, or other groups may be introduced into the molecule prior to sulfonation to alter in some degree the shade of the resulting dyestuffs.

The following examples are given to illustrate the invention. The parts used are by weight:

Example 1

One hundred-twenty-five (125) parts of 2-bromo-fluorenone (prepared by brominating fluorenone in ortho-dichloro-benzene solution with the theoretical amount of a mixture of one-half mole of sulfuryl chloride and one mole of bromine in the presence of a trace of iodine as a catalyst), one hundred fifteen (115) parts of 1-amino-anthraquinone, two and one-half (2.5) parts of cuprous chloride, sixty (60) parts of soda ash, and twelve hundred (1200) parts of nitrobenzene are heated together in a flask with agitation to 205° C. for 8 hours. The nitrobenzene is most conveniently removed by steam distillation, although a somewhat purer product is obtained if the reaction mixture is cooled to 80° C. and filtered at that temperature to separate the nitrobenzene from the insoluble product. The product is then steam distilled to remove last traces of nitrobenzene and dissolve out the water soluble material. Then it is filtered and washed with hot water and dried. The 1(2'-fluorenonylamino)-anthraquinone so produced is a dark red-violet powder having a melting point of 255°, and a nitrogen content of 3.67%. It forms a red-brown vat with alkaline hydrosulfite.

Two amine groups are introduced into the 4 and 7' positions by the following process.

One hundred eighty (180) parts of the product as described above are dissolved in a previously prepared solution of ninety (90) parts of boric acid in eighteen-hundred (1800) parts of 98% sulfuric acid. When solution is complete the material is cooled to 5° C. and eighty-two and one-half (82.5) parts of 70% nitric acid are added slowly while the temperature is kept at 5–10° C. The mixture is allowed to warm up to 25° C. overnight, and is then poured into eight thousand (8000) parts of ice-water. The suspension so formed is heated to 90° C. for an hour, filtered, and washed acid free. The wet filter cake is suspended in eight thousand (8000) parts of water and one hundred fifty (150) parts of sodium sulfide is added. This suspension is then heated to 85° C. for half an hour and subsequently to boiling for an additional half an hour. The suspension is filtered and washed with hot water until sulfide free, and dried. This product is a black powder, with a melting point of 255° C. and a nitrogen content of 8.32%.

This same compound may also be prepared by condensing 2-benzoylamino-7-bromo-fluorenone (prepared by nitration of 2-bromo-fluorenone in 96% sulfuric acid and reduction with sodium sulfide followed by benzoylation with benzoyl chloride in ortho-dichloro-benzene) with 1-benzoyl-amino-4-amino-anthraquinone in nitrobenzene and then removing the benzoyl groups by hydrolysis with 93% sulfuric acid at elevated temperatures.

The addition of two sulfonic acid groups to the product described above may be accomplished by the following process.

Ninety (90) parts of the 4:7'-diamino-1(2'-fluorenonyl-amino)-anthraquinone just described is dissolved in a previously prepared solution of fifty-five (55) parts of boric acid and one (1.0) part of mercuric oxide in one thousand three hundred fifty (1350) parts of 28% oleum. This solution is heated to 135° for two hours, cooled and poured into ten thousand parts (10,000) of ice-water. The solution is heated to boiling and boiled for an hour, and the product isolated as the disodium salt by adding four hundred parts (400) of sodium chloride and cooling. The precipitated dye is filtered off and re-dissolved in a large volume of hot water made slightly alkaline with sodium hydroxide. The solution is filtered and the filtrate salted to a concentration of 4% sodium or potassium chloride at 95–100° C. by the addition of solid salt and cooled. The dye is filtered off and washed with 4% salt solution and dried. This product is a black powder which dyes wool gray shades which change to olive on chroming.

*Example 2*

By means of the procedures outlined in Example 1, two (2) parts of 2-bromofluorenone are condensed with one (1) part of 1:4-diamino-anthraquinone in nitrobenzene at 205°. The 1:4 - di(2'-fluorenonylamino)-anthraquinone so obtained is a dark blue powder having a melting point of 376°, and a nitrogen content of 3.97%. The material does not vat under the usual vatting conditions.

The 1:4 - di-(2' - fluorenonylamino)-anthraquinone so prepared may be sulfonated directly according to the process described in Example 1 using a large excess of 28% oleum containing boric acid and a mecury salt at 135° C. for about two hours. This sulfonated product dyes wool in blue-gray shades changing to neutral gray on chroming.

A color of deeper shade is obtained by the introduction of two amino groups prior to sulfonation. This is accomplished by procedures such as described in Example 1. The resulting product which is the 1,4-di-(7'-amino-2'-fluorenonyl-amino)-anthraquinone after sulfonation dyes wool in neutral gray shades changing to olive on chroming.

*Example 3*

Two (2) parts of 2-bromo-fluorenone are condensed with one (1) part of 1:5-diamino-anthraquinone in the manner described in Example 1. The product so obtained is a dark brown powder which does not vat under the usual conditions. It has a melting point above 400° C. and a nitrogen content of 5.01%.

The 1:5-di-(2'-fluorenonylamino)-anthraquinone so produced may be sulfonated directly by the procedure described in Example 1. The product so formed is a dark blue powder which dyes wool in blue gray shades changing to olive gray on chroming.

A dyestuff of deeper shade is obtained if two amino groups are introduced prior to sulfonation. This is accomplished by the procedure outlined in Example 1. This material after sulfonation dyes wool in neutral gray shades changing to an olive on chroming.

*Example 4*

One and one-eighth (1.13) parts of 2-bromo-fluorenone are condensed with one (1) part of 1-amino-4-hydroxy-anthraquinone according to the procedure described in Example 1. The product so obtained is a dark red powder melting above 400° C. and has a nitrogen content of 2.85%. An amino group can be introduced in the 7'-position of this 1-(2'-fluorenonylamino)-4-hydroxy-anthraquinone by the processes described in Example 1 using the theoretical amount of nitric acid. The material so produced is a dark brown powder having a melting point of 280° C., and a nitrogen content of 6.01%.

The product as described above is sulfonated according to the procedure in Example 1. This sulfonated material dyes wool in blue-gray shades changing to olive-gray on chroming.

*Example 5*

One (1) part of 2:7-dibromofluorenone (formed by brominating fluorene in ortho-dichloro-benzene solution with one (1) mole of bromine mixed with one-half (.5) mole of sulfuryl chloride using a trace of iodine as a catalyst and oxidizing the 2:7-dibromo-fluorene so produced with sodium dichromate in acetic acid) is condensed with one and one-half (1.5) parts of 1-amino-anthraquinone according to the procedure described in Example 1. The product forms a red-brown vat with alkaline hydrosulfite. It is a dark brown powder having a melting point of 360°, and a nitrogen content of 4.47%.

The 2:7-di-(1'-anthraquinonyl-amino)-fluorenone so prepared may be sulfonated directly by the procedure described in Example 1. This sulfonated material dyes wool a blue-gray changing to a neutral gray on chroming.

A dyestuff of deeper shade is obtained by introducing two amino groups into the para positions in each of the anthraquinone nuclei prior to sulfonation. This is accomplished by the processes in Example 1. The resulting 2,7-di-(4'-amino-1'-anthraquinonylamino)-fluorenone is a black powder, having a melting point of 320° C. (decomposes), and a nitrogen content of 8.08%. The sulfonated product is a black powder which dyes wool in neutral gray shades changing to olive on chroming.

*Example 6*

One (1) part of 2-bromo-fluorenone is condensed with one (1) part of 1-amino-6-chloro-anthraquinone according to the procedure described in Example 1. The resulting product is a brown solid with a melting point of 252° C., a chlorine content of 9.06%, and a nitrogen content of 2.41%.

The 1-(2'-fluorenonylamino)-6-chloro-anthraquinone just described is further condensed with amino-anthraquinones for example one (1) part of it may be condensed with eighty-five one hundredths (0.85) part of 1-amino-4-benzoylamino-anthraquinone in the usual manner, the benzoyl group hydrolyzed by heating in 93% sulfuric acid and product sulfonated. The product before sulfonation is a dark blue-black powder containing 6.04% nitrogen. The sulfonated material is a black powder which dyes wool blue-gray shades changing to neutral gray on chroming.

Other amino-anthraquinones may be substituted in this example such as 1-amino-5-benzoyl-amino-anthraquinone, in which case eighty-five one hundredths (0.85) part of 1-amino-5-benzoyl-amino-anthraquinone is condensed with one (1) part of the 1-(2'-fluorenonylamino)-6-chloro-anthraquinone in the usual manner and the benzoyl group hydrolyzed by heating with 93% sulfuric acid. The resulting product is a dark brown powder containing 6.09% of nitrogen. On sulfonation a black solid is produced which dyes wool neutral shades of gray which change to olive-gray on chroming.

*Example 7*

One (1) part of 2-bromo-7-hydroxy-fluorenone (prepared by diazotization of 2-bromo-7-amino-fluorenone) containing 27.77% of bromine and 1.80% of nitrogen is condensed with nine-tenths (0.9) part of 1-amino-anthraquinone as described in Example 1. To this product is added one amino group by nitration and reduction according to the procedure described in Example 1. The 1-(7'-hydroxy-2'-fluorenonylamino)-4-amino-anthraquinone so produced is a dark brown powder. It melts above 400° C., and has a nitrogen content of 6.24%.

This material when sulfonated according to the procedure described in Example 1 with the exception that the oleum used is 37% and the reaction is carried out at 160–165° C. for 6 hours, gives a product which dyes wool in olive-gray shades changing to olive on chroming.

While in the above examples the sulfonic acids are isolated in the form of their alkali metal salts it will be obvious that the free acids can be prepared in the usual manner by controlled dilution of the sulfonation mixture to a concentration of approximately 60% sulfuric acid at which point the free sulfonic acid precipitates out and may be removed by filtration and washed with 60% sulfuric acid and then with brine acidified with hydrochloric acid, and then dried; or they may be prepared by heating the alkali metal salts in dilute hydrochloric acid until the free acid is precipitated and then filtered. In salting out the sulfonic acids either the sodium or potassium salts may be employed.

We claim:

4,7'-diamino-1(2'- fluorenonylamino) - anthraquinone sulfonic acid and its alkali metal salts.

RALPH N. LULEK.
OLIVER H. JOHNSON.